(12) United States Patent
Mueh et al.

(10) Patent No.: US 9,221,689 B2
(45) Date of Patent: Dec. 29, 2015

(54) MONOCHLOROSILANE, PROCESS AND APPARATUS FOR THE PREPARATION THEREOF

(75) Inventors: Ekkehard Mueh, Rheinfelden (DE);
Hartwig Rauleder, Rheinfelden (DE);
Juergen Erwin Lang, Karlsruhe (DE);
Reinhold Schork, Grasellenbach (DE)

(73) Assignee: Evonik Degussa GmbH, Essen (DE)

( * ) Notice: Subject to any disclaimer, the term of this patent is extended or adjusted under 35 U.S.C. 154(b) by 111 days.

(21) Appl. No.: 13/985,477

(22) PCT Filed: Jan. 19, 2012

(86) PCT No.: PCT/EP2012/050754
§ 371 (c)(1),
(2), (4) Date: Aug. 14, 2013

(87) PCT Pub. No.: WO2012/110275
PCT Pub. Date: Aug. 23, 2012

(65) Prior Publication Data
US 2013/0323151 A1  Dec. 5, 2013

(30) Foreign Application Priority Data
Feb. 14, 2011 (DE) .................. 10 2011 004 058

(51) Int. Cl.
*C01B 33/107* (2006.01)
*B01J 31/02* (2006.01)

(52) U.S. Cl.
CPC ......... *C01B 33/1071* (2013.01); *B01J 31/0274* (2013.01); *B01J 31/0275* (2013.01); *C01B 33/10773* (2013.01)

(58) Field of Classification Search
CPC ................................................ C01B 33/10773
USPC ...................................................... 423/342
See application file for complete search history.

(56) References Cited

U.S. PATENT DOCUMENTS

| | | | |
|---|---|---|---|
| 3,968,199 A | 7/1976 | Bakay | |
| 7,632,478 B2 | 12/2009 | Poepken et al. | |
| 8,002,954 B2 | 8/2011 | Popp et al. | |
| 8,038,961 B2 | 10/2011 | Sonnenschein et al. | |
| 8,105,564 B2 | 1/2012 | Sonnenschein et al. | |
| 8,221,593 B2 | 7/2012 | Lang et al. | |
| 8,246,925 B2 | 8/2012 | Schwarz et al. | |
| 8,485,361 B2 | 7/2013 | Rauleder et al. | |
| 2008/0095691 A1* | 4/2008 | Sonnenschein et al. | 423/342 |
| 2009/0155156 A1 | 6/2009 | Sonnenschein et al. | |
| 2010/0080746 A1 | 4/2010 | Lang et al. | |
| 2010/0266489 A1 | 10/2010 | Rauleder et al. | |
| 2010/0278706 A1 | 11/2010 | Mueh et al. | |
| 2010/0296994 A1 | 11/2010 | Rauleder et al. | |
| 2011/0052474 A1 | 3/2011 | Mueh et al. | |
| 2011/0150739 A1 | 6/2011 | Seliger et al. | |
| 2012/0177557 A1 | 7/2012 | Rauleder et al. | |
| 2012/0183464 A1 | 7/2012 | Mueh et al. | |
| 2012/0195804 A1 | 8/2012 | Lang et al. | |
| 2012/0214005 A1 | 8/2012 | Mueh et al. | |
| 2013/0043893 A1 | 2/2013 | Mueh et al. | |

FOREIGN PATENT DOCUMENTS

| | | |
|---|---|---|
| CN | 1926061 A | 3/2007 |
| CN | 101466463 A | 6/2009 |
| DE | 25 07 864 | 8/1975 |
| DE | 10 2007 059 170 | 6/2009 |
| JP | 63303807 A | 12/1988 |
| JP | 2008/0513325 A | 5/2008 |
| JP | 2010/0248067 A | 11/2010 |
| WO | 2007 039326 | 4/2007 |
| WO | 2011 006695 | 1/2011 |
| WO | 2011 006697 | 1/2011 |
| WO | 2012 062526 | 5/2012 |
| WO | 2012 062560 | 5/2012 |
| WO | 2012 062562 | 5/2012 |
| WO | 2012 110275 | 8/2012 |
| WO | 2012 139807 | 10/2012 |

OTHER PUBLICATIONS

U.S. Appl. No. 14/131,126, filed Jan. 6, 2014, Hoppe, et al.
U.S. Appl. No. 14/117,925, filed Nov. 15, 2013, Doering, et al.
U.S. Appl. No. 14/344,793, filed Mar. 13, 2014, Hoppe, et al.
International Search Report Issued May 2, 2012 in PCT/EP12/050754 filed Jan. 19, 2012.
U.S. Appl. No. 13/884,326, filed May 9, 2013, Mueh, et al.
U.S. Appl. No. 13/884,473, filed May 9, 2013, Mueh, et al.
U.S. Appl. No. 14/111,643, filed Oct. 14, 2013, Mueh, et al.

\* cited by examiner

*Primary Examiner* — Matthew E Hoban
*Assistant Examiner* — James Fiorito
(74) *Attorney, Agent, or Firm* — Oblon, McClelland, Maier & Neustadt, L.L.P.

(57) ABSTRACT

The invention relates to a process for preparing monochlorosilane by reaction of monosilane and dichlorosilane in the presence of a catalyst. In the process of the invention, monochlorosilane is formed by comproportionation of monosilane and dichlorosilane. The invention further relates to the use of the monochlorosilane produced and also a plant for carrying out the process.

12 Claims, 2 Drawing Sheets

Figure 1:
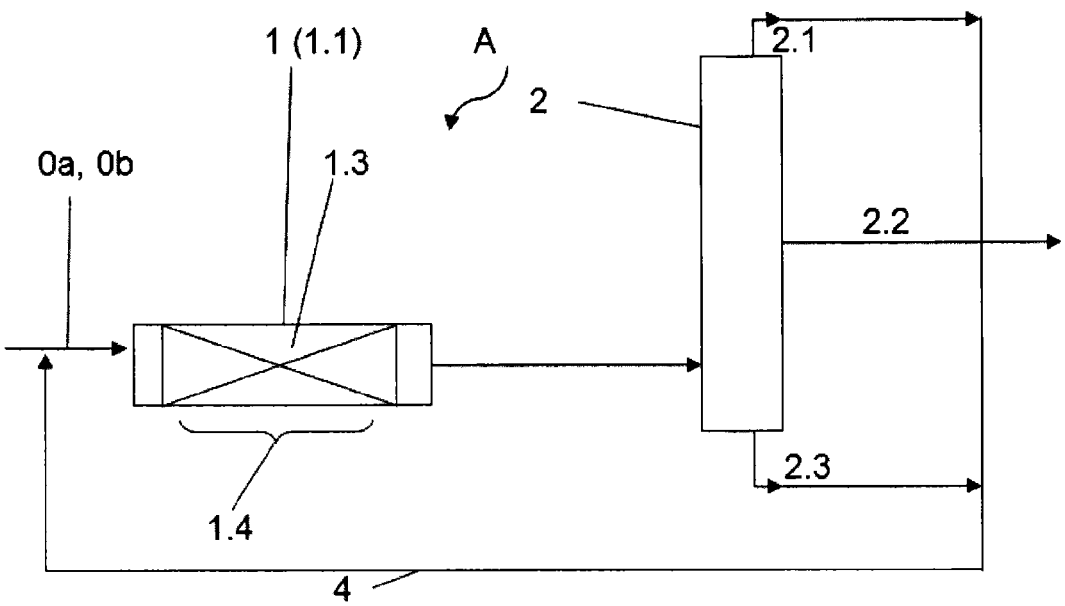

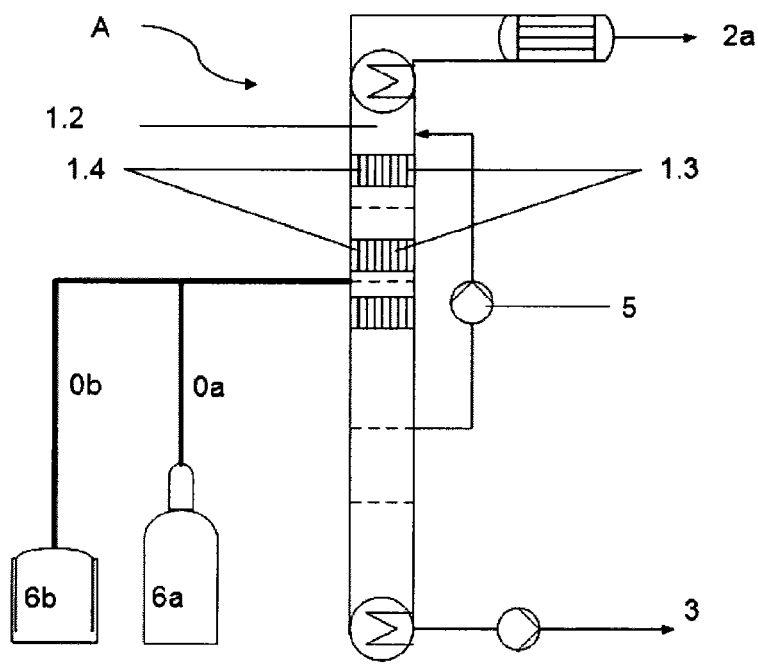
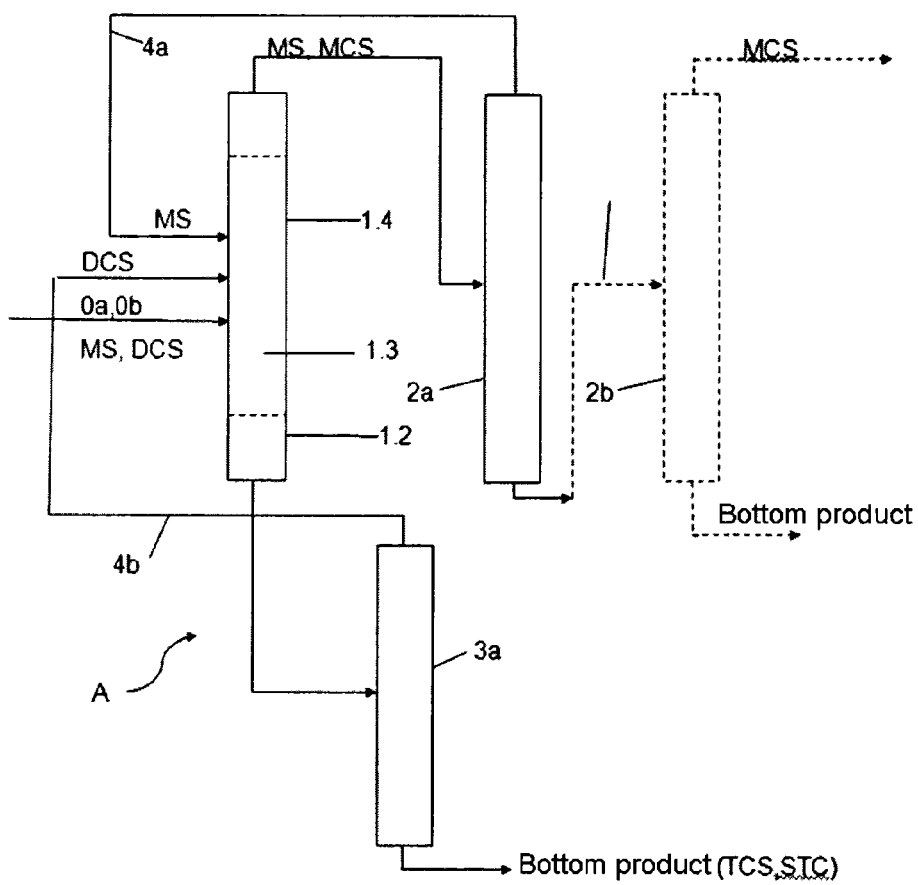
Figure 3:
Figure 4:

MONOCHLOROSILANE, PROCESS AND APPARATUS FOR THE PREPARATION THEREOF

The invention relates to a process for preparing monochlorosilane by reaction of monosilane and dichlorosilane in the presence of a catalyst. In the process of the invention, monochlorosilane is formed by comproportionation of monosilane and dichlorosilane. The invention further relates to the use of the monochlorosilane produced and also a plant for carrying out the process.

Inorganic Si compounds such as tetrachlorosilane, trichlorosilane, dichlorosilane and monosilane are used for the deposition of high-purity Si layers, for example in the semiconductor industry, and recently also in the solar industry. Industrial production processes are therefore also known for the abovementioned compounds. An exception is monochlorosilane, in the case of which there has hitherto been no known process able to provide it in industrial quantities and the required high purity. For this reason, $H_3SiCl$ has hitherto also not been used for the deposition of silicon, for example as silicon bars (bulk silicon) or silicon layers.

In addition, chlorinated H-silanes such as trichlorosilane are valuable starting compounds for the preparation of Si compounds containing organic radicals, for example of trimethylsilane [$HSi(CH_3)_3$], a substance which is important for the semiconductor industry. Comparable processes for preparing organofunctional silicon compounds starting from monochlorosilane are not known because of the lack of availability of the latter.

GB 761205 discloses a process in which trichlorosilane is catalytically disproportionated/dismuted to prepare dichlorosilane. Monochlorosilane is only obtained in very small amounts as by-product of the dismutation of trichlorosilane.

WO 2006/029930 A1 describes monochlorosilane merely as intermediate which can be formed from trichlorosilane as a result of dismutation (disproportionation).

DE 3711444 A1 discloses a process for preparing dichlorosilane by dismutation (disproportionation) of trichlorosilane, in which gaseous dichlorosilane is taken off from the reactor at a temperature in the range from 10° C. to the boiling point of the resulting reaction mixture and is isolated, with trichlorosilane present condensing and being recirculated to the reactor and the liquid reaction phase being partly taken off from the reactor and separated into tetrachlorosilane and trichlorosilane which is to be recirculated to the reactor.

As shown, monochlorosilane has hitherto not been able to be obtained economically from TCS by the disproportionation (dismutation) route.

It was therefore an object of the invention to make pure monochlorosilane available on an industrial scale. In particular, it was an object of the invention to provide a process for preparing monochlorosilane, in which monochlorosilane is formed on an industrial scale, in pure form and in substantial amounts relative to the starting materials used. A particular object was to make monochlorosilane available industrially in high-purity form and to develop an industrial process for the targeted preparation of monochlorosilane. The process for preparing monochlorosilane should also be economical. A further object was to provide a plant for carrying out the process economically. A particular advantage of the monochlorosilane obtained is the significantly lower exposure to chloride of the plants or plant components in the later deposition of silicon. In addition, the energy consumption in the deposition is lower and the transport weight based on the Si content is significantly lower compared to the more highly chlorinated silanes.

The objects are achieved as set forth in the independent claims, and preferred embodiments are presented in the dependent claims and also in detail in the description.

It has completely surprisingly been found that monochlorosilane can be obtained continuously from monosilane ($SiH_4$) and dichlorosilane ($H_2SiCl_2$) in a catalytic comproportionation process according to reaction equation 1

$$SiH_4 + H_2SiCl_2 \underset{}{\overset{cat.}{\rightleftarrows}} 2\, H_3SiCl \qquad (1)$$

Monochlorosilane is preferably formed in an amount of significantly above 5 mol %, preferably in the range from 5 to 10 mol %, per process stage, based on the amount of the two starting materials monosilane and dichlorosilane used in mole (100 mol %). According to the invention, monosilane and dichlorosilane are supplied to the process in a defined molar ratio, in particular in a ratio of from 15:1 to 6:1, in particular from 13:1 to 8:1. Particular preference is given to using 92 mol % of monosilane and 8 mol % of dichlorosilane in the process, with the range of fluctuation based on 100% being plus/minus 5%, preferably plus/minus 2%. The yield of monochlorosilane can be increased to above 12 mol %, in particular to 15 mol %, based on the starting materials used, when the monochlorosilane (MCS) formed is separated off after a reaction and the remaining monosilane and dichlorosilane having a defined composition is returned to the process stage or fed into a subsequent process stage. Circulation in a defined ratio of the monosilane and dichlorosilane separated off from the crude product enables the highest yields (in mol %) of monochlorosilane to be achieved. According to the invention, monosilane and/or dichlorosilane are supplied to the process in a defined ratio, which in the following is always mol:mol, in particular in a ratio of from 13:1 to 8:1. The advantage according to the invention of the comproportionation of monosilane and dichlorosilane to form monochlorosilane is that no by-products have to be separated off. The separation of monosilane (b.p. −111.9° C.), monochlorosilane (b.p.: −30.4° C.) and dichlorosilane (b.p.: 8.3° C.) can therefore be carried out at low temperatures with a very low energy consumption.

In a particularly preferred alternative variant of the process of the invention, the formation of trichlorosilane and/or tetrachlorosilane can be substantially suppressed in the reaction of monosilane and dichlorosilane, particularly when monosilane and dichlorosilane are reacted in a defined molar ratio in the presence of a catalyst, in particular when they are fed in as starting materials in a defined ratio. Further preference is given to monosilane and dichlorosilane being reacted with one another in a defined ratio resulting in predominantly a comproportionation occurring, for example in the range from 15:1 to 6:1 (MS:DCS). In the process of the invention, trichlorosilane (TCS) is formed in a proportion of less than 30% (GC) and/or tetrachlorosilane (TCS) is formed in a proportion of less than 4.0%, preferably TCS in a proportion of from <5% to 0.01%, particularly preferably less than 4%, less than 3%, less than 2%, more preferably less than 1.5%, in the total crude product.

The process for preparing monochlorosilane is preferably carried out in a plant which comprises a reaction region containing the catalyst for the reaction of monosilane and dichlorosilane. Preference is given to at least one reaction region being provided in a reactor such as a reactive column or a tube reactor. The crude product formed in the reaction region of the reactor from the reaction of monosilane and dichlorosilane is transferred to at least one subsequent thermal separation process step and monochlorosilane is obtained, possibly in admixture with more highly chlorinated silanes. Preference is given to monochlorosilane being separated off from the crude product in a subsequent thermal separation process step, with monosilane and dichlorosilane preferably being returned to the reaction, in particular the comproportionation. The crude product is preferably subjected to a plurality of thermal separation process steps and monochlorosilane is isolated in pure form. The thermal separation process steps are preferably carried out in columns, particularly preferably in rectification columns.

The invention provides a process for preparing monochlorosilane by reacting monosilane and dichlorosilane, in particular as starting materials, in the presence of a catalyst to form monochlorosilane. In a process according to the invention, monosilane and dichlorosilane are supplied to the reaction in a defined molar ratio. This measure at the same time controls the molar ratio of monosilane to dichlorosilane during the reaction. In the process of the invention, monosilane and dichlorosilane are fed as starting materials to the process in order to form monochlorosilane under catalytic conditions. Particular preference is given to monosilane and dichlorosilane being comproportionated in the presence of a catalyst in the process of the invention; in particular monosilane and dichlorosilane are comproportionated to form monochlorosilane. The process can be carried out batchwise or preferably continuously. According to the invention, monochlorosilane is formed from monosilane and dichlorosilane in a continuous process.

For the purposes of the present invention, industrially pure monosilane is monosilane having a purity of greater than 97%.

For the present purposes, an industrial scale is preferably the continuous preparation of at least 10 g/h of monochlorosilane from monosilane and dichlorosilane, preferably at least 100 g/h, particularly preferably at least 1 kg/h. In a batch preparation, it should preferably be possible to prepare 5 kg, particularly preferably 25 kg, of monochlorosilane per batch. After the process of the invention, monosilane and dichlorosilane can be fed to a reaction region or a reactor; in particular, they are fed in admixture or in countercurrent to a separation stage. The reactor comprising a reaction region can be a tube reactor or a reactive column, with the reactive column optionally being able to comprise a plurality of reaction zones such as distributor trays, bubble cap trays, etc.

In an alternative variant of the invention, the comproportionation, in particular the heterogeneously catalyzed comproportionation, of monosilane and dichlorosilane is carried out in a reactor, in particular a tube reactor, preferably in a plurality of, preferably from 2 to 10, tube reactors which are connected in series or parallel. As an alternative, the monosilane and dichlorosilane separated off from the crude product in the process are every now and again recirculated to the reactor, in particular the tube reactor, with the monochlorosilane formed being separated off from the crude product. Particular preference is given to monosilane and dichlorosilane being fed in a defined ratio to the respective reaction regions of the reactors, in particular the tube reactors. The ratio of monosilane to dichlorosilane is, for a reaction to form monochlorosilane, preferably from 15:1 to 1:1, preferably from about 13:1 to 5:1, more preferably from about 13:1 to 8:1, with a ratio of from about 11.5:1 to 9:1, optionally with a range of variation of from 12:1 to 6:1, being more preferred. In this preferred range, monosilane and dichlorosilane are comproportionated to form monochlorosilane. Outside the preferred range from 13:1 to 8:1, disproportionation occurs to an increased extent. The comproportionation is the preferred way of carrying out the process since no by-products such as TCS and/or STC are formed and have to be separated off. According to the invention, monosilane and/or dichlorosilane are supplied to the process in a defined ratio, in particular in a ratio of from 13:1 to 8:1, at which essentially no trichlorosilane and/or tetrachlorosilane are formed, i.e. under conditions of a comproportionation. Under these conditions, TCS is preferably formed in an amount of less than 1 mol % after reaction in the third tube reactor. The formation of trichlorosilane can be used as an indicator for a change from comproportionation to disproportionation.

The reaction conditions are preferably set to about 40° C. and about 30 bar(abs.), with it being clear to a person skilled in the art that the temperature can also be chosen freely in the range from −50 to 200° C. and the pressure can be chosen within a pressure range from 0.0001 to 200 bar. The pressure is always absolute ($bar_{abs}$). In a preferred alternative variant, the process is carried out with a low energy consumption at slightly elevated temperature and within a pressure range from 0.1 to 100 bar at from 25 to 60° C., preferably at from 30 to 50° C. and from 20 to 40 bar, particularly preferably about 40° C. and about 30 bar.

In an alternative variant of the invention, the comproportionation, in particular the heterogeneously catalyzed comproportionation, of monosilane and dichlorosilane is carried out in a reactor configured as a reactive column having reaction region(s).

In the process of the invention, at least part of the crude product, preferably the entire crude product, from the reaction is separated into the individual silanes monochlorosilane and monosilane, dichlorosilane and possibly trichlorosilane and also possibly tetrachlorosilane in at least one subsequent thermal separation process step. For the purposes of the present invention, the crude product is the reaction product, i.e. the mixture formed, from the reaction of the starting materials monosilane and dichlorosilane introduced, optionally in the presence of a catalyst and optionally in the presence of trichlorosilane and/or tetrachlorosilane. The process of the invention is particularly preferably carried out at a defined ratio of monosilane to dichlorosilane at which essentially no by-products such as trichlorosilane and/or tetrachlorosilane are formed because the reaction proceeds essentially as a comproportionation. The subsequent at least one thermal separation process step is preferably a distillation, particularly preferably a rectification, in which separation into monochlorosilane and also monosilane and dichlorosilane and also trichlorosilane is carried out. An evaporation by means of evaporators known to those skilled in the art, for example a thin film evaporator, can also be advantageous. It can also be preferred to add on a plurality of distillation steps, in particular rectification steps, in order to set the desired purity of the products monochlorosilane, trichlorosilane or tetrachlorosilane. Monosilane and dichlorosilane are, after the process of the invention, returned as starting materials to the process and can therefore also be recirculated as a mixture with, optionally, proportions of other products (monochlorosilane, very small amounts of TCS) or fed to a subsequent reaction region of the next process stage, i.e. fed to a second and/or third reactor.

In a particularly preferred alternative variant of the invention, monochlorosilane is taken off at a side offtake of a rectification column. In further preferred alternative variants, monochlorosilane is taken off together with monosilane and dichlorosilane as overhead product and separated into the individual compounds by means of subsequent columns. As indicated, unreacted monosilane and/or dichlorosilane present after the reaction and/or monosilane and/or dichlorosilane formed are, in each case independently or in admixture, returned to the reaction region or reactor and/or fed to subsequent reaction regions in the process. The monosilane and/or dichlorosilane separated off from the crude product by means of thermal separation process steps, in particular, is/are returned as starting materials to the process. Preference is also given to monosilane and/or dichlorosilane being fed as starting materials to the process, in particular the reaction region or reactor, only in amounts corresponding to the amounts of monosilane and/or dichlorosilane consumed in the process.

The process for preparing monochlorosilane from monosilane and dichlorosilane is carried out in the presence of a catalyst in a homogeneous or heterogeneous phase. The comproportionation is preferably carried out under heterogeneous catalysis conditions. As catalysts, preference is given to using the catalysts mentioned below, with preference being given to using nitrogen-containing compounds as comproportionation catalysts, preferably supported or solid insoluble nitrogen-containing compounds.

The invention thus also provides for the use of nitrogen-containing compounds, in particular as a solid phase, in a process for the comproportionation of the starting materials monosilane and dichlorosilane, in particular in a process according to any of Claims 1 to 15. The invention also provides for the use of nitrogen-containing compounds as catalyst for comproportionation in a process for preparing at least one halosilane using monosilane and dichlorosilane as starting materials, in particular for preparing monochlorosilane, advantageously also for preparing trichlorosilane, monosilane and/or tetrachlorosilane.

A preferred catalyst is supported and is in particular chemically bound to the support material. Particular preference is given to catalysts comprising an aminoalkoxysilane which is preferably chemically bound to the support material; in particular, the catalyst composition, optionally in the form of a shaped body such as a sphere or rod or in particulate form, comprises an aminoalkoxysilane and optionally hydrolysis and/or condensation products thereof chemically bound to a support material. According to the invention, the catalyst is an aminoalkoxysilane of the general formula 1 or at least one hydrolysis and/or condensation product thereof,

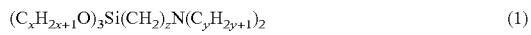

$(C_xH_{2x+1}O)_3Si(CH_2)_zN(C_yH_{2y+1})_2$ (1)

where the indices x are each, independently of one another, 1, 2, 3 or 4, the indices y are each, independently of one another, 1, 2, 3, 4, 5, 6, 7, 8, 9 or 10 and the indices z are each, independently of one another, 1, 2 or 3, or a monomeric or oligomeric aminosilane derived therefrom chemically bound to the support material.

The group $-(C_yH_{2y+1})$ of the formula 1 can, independently, be an n-alkyl, isoalkyl and/or tert-alkyl group. Particularly preferred compounds of the general formula 1 and aminosilanes derived therefrom, especially chemically bound to a support material, are selected from the group: x=1, z=3 and y=1; x=2, z=3, y=1; x=1, z=3, y=2; x=2, z=3, y=2; x=1, z=3 and y=8; x=2, z=3, y=8; x=1, z=3, y=4; x=2, z=3, y=4.

Preferred catalysts are based on diisobutylaminopropyltriethoxysilane, di-n-butylaminopropyltriethoxysilane, di-tert-butylaminopropyltriethoxysilane, dioctylaminopropyltriethoxysilane, diisobutylaminopropyltrimethoxysilane, di-n-butylaminopropyltrimethoxysilane, di-tert-butylaminopropyltrimethoxysilane, dioctylaminopropyltrimethoxysilane.

In a further preferred alternative variant, the support material comprises shaped bodies comprising silicon oxide. For the purposes of the present invention, shaped bodies comprising silicon dioxide are, in particular, granular materials, pellets, spherical $SiO_2$ shaped bodies, Raschig rings or extrudates or continuous cast bodies of any shape. The support material particularly preferably consists of $SiO_2$ shaped bodies, more preferably spherical $SiO_2$ bodies. Further preferred support materials are inorganic materials such as $Al_2O_3$, organic materials such as polymers or composites such as highly filled thermosets or thermoplastics.

Further preferred catalysts which can be used for the preparation of monochlorosilane and also for the use according to the invention can be amines, ammonium salts, aminosilanes, aminosiloxanes and also supported aminosilanes or aminosiloxanes. $NH_nR_{3-n}$ where n=0, 1 or 2 and R is an aliphatic linear or branched or cycloaliphatic or aromatic hydrocarbon radical having from 1 to 18 carbon atoms, where the radicals R can be identical or different. Nonexhaustive examples are: trimethylamine, triethylamine, tri-n-propylamine, tri-i-propylamine, tri-n-butylamine, tri-i-butylamine, tri-t-butylamine, tri-n-pentylamine, tri-n-hexylamine, tri-n-heptylamine, tri-n-octylamine, tri-n-decylamine, tri-n-dodecylamine, tri-i-octylamine. Quaternary ammonium salts $[NH_mR^1_{4-m}]^+Z^-$ where m=0, 1, 2 or 3 and $R^1$ is an aliphatic linear or branched or cycloaliphatic or aromatic hydrocarbon having from 1 to 18 carbon atoms, where the radicals $R^1$ can be identical or different, and the anion Z is, for example, a halide such as fluoride, chloride, bromide, iodide; or a nitrate, phosphate, sulphate, acetate, formate, propionate. Furthermore, N-methyl-2-pyrrolidone, methylimidazoles, tetramethylurea, tetramethylguanidine, trimethylsilylimidazole, benzothiazole, N,N-dimethylacetamide can be used as catalysts. It is also possible to use mixtures of the abovementioned catalysts. Furthermore, ion exchangers can be used as catalysts, e.g. in the form of catalysts based on divinylbenzene-crosslinked polystyrene resin having tertiary amino groups produced by direct aminomethylation of a styrene-divinylbenzene copolymer (DE 100 57 521 A1), on solids which bear amino or alkylenamino groups, for example dimethylamino groups, on a framework composed of polystyrene crosslinked with divinylbenzene (DE 100 61 680 A1, DE 100 17 168 A1), catalysts based on anion-exchange resins having tertiary amino groups or quaternary ammonium groups, for example Amberlyst A21 or Amberlyst A26 from Rohm and Haas (DE 33 11 650 A1), aminofunctionalized inorganic supports (DE 37 11 444 A1) or, according to DE 39 25 357, organopolysiloxane catalysts such as $N[(CH_2)_3SiO_{3/2}]_3$. Furthermore, silanes, siloxanes and supported silanes, siloxanes as described in DE 3711444, especially as described in DE 102007059170.7, can also preferably be used. The abovementioned patent specifications are fully incorporated by reference and their contents in respect of the catalysts are made part of the contents of the present document.

The process for the reaction of monosilane and dichlorosilane for preparing monochlorosilane is carried out in the temperature range from −50° C. to 200° C. and in particular within the pressure range from 0.0001 $bar_{abs}$ to 200 $bar_{abs}$. In a further alternative variant, the reaction can also preferably be carried out, for example, at from 50 to 200° C. and in particular at from 1 to 150 bar, preferably from 75 to 180° C. and in particular at from 1 to 40 bar, particularly preferably from 100 to 175° C. and in particular at from 5 to 30 bar. In this alternative variant, a temperature range from 140 to 160° C. plus/minus 20° C. at a pressure of 20 bar plus/minus 5 bar has been found to be very particularly preferred.

As an alternative, monosilane and dichlorosilane can preferably be supplied as starting materials to the process in a molar ratio of from 20:1 to 1:20, preferably from 1:10 to 15:1, in particular in a molar ratio of from 15:1 to 6:1, preferably from 12:1 to 5:2, particularly preferably about 1:1, in each case, independently, plus/minus 0.5, preferably plus/minus 0.25. Furthermore, particular preference is given to, in each case independently, the unreacted dichlorosilane and monosilane and/or dichlorosilane and monosilane formed in the process being fed batchwise or preferably continuously as starting materials to the process. It will be clear to a person skilled in the art that, depending on the reaction conditions such as temperature and pressure, ratios of monosilane to dichlorosilane of from 13:1 to 1:13, with all ratios in between including 1:1, can also be preferred. The reaction of monochlorosilane and dichlorosilane in the process occurs essentially by means of comproportionation, when the reaction is carried out within the range from about 12:1 to 9:1, of monosilane to dichlorosilane. An addition of monosilane suppresses the disproportionation of dichlorosilane, i.e. when the content of monosilane is too low relative to dichlorosilane, the degree of dismutation increases, while in the range of preferably from 13:1 to 8:1 it is strongly suppressed and the comproportionation predominates. The two competing reactions or reaction routes comproportionation and dismutation can therefore be controlled via fine adjustment of the ratios of monosilane to dichlorosilane.

The invention also provides a process in which monosilane and dichlorosilane are essentially disproportionated in the presence of a catalyst, since outside the abovementioned preferred range the reaction in the process occurs essentially as a disproportionation, i.e. at a molar ratio of from 20:1 to 1:20 of monosilane to dichlorosilane, with the range from about 13:1 to 8:1, in which comproportionation prevails, being excepted, preferably with from 12:1 to 9:1 being excepted.

In addition or as an alternative to one of the abovementioned features, preference is given to the reaction, in particular the comproportionation, being carried out in a reaction region of a reactor such as a reactive column, stirred vessel, tube reactor or loop reactor, preferably in a reactive column having a plurality of reaction regions. Furthermore, at least part of the crude product can be separated into the individual silanes monochlorosilane and also monosilane, dichlorosilane and possibly trichlorosilane and/or tetrachlorosilane in at least one subsequent thermal separation process step. Here, it is more particularly preferred for monochlorosilane to be taken off at a side offtake of a reactive column, in particular a rectification column.

The invention thus also provides pure monochlorosilane having a content (GC) of at least from 99.5% to 99.9% (GC %). The purity in respect of metallic impurities is from 99.99 to 99.9999%, i.e. from 4n to 6n, preferably from 99.999 to 99.9999999%, i.e. from 5n to 9n, as high-purity monochlorosilane. The content of pure monochlorosilane is determined by means of GC and the purity can be determined by the methods known to those skilled in the art, e.g. ICPMS. The specific resistance of an Si layer or Si rod produced from this monochlorosilane is greater than 20 Ohm×cm, preferably above 200 Ohm×cm, very particularly preferably greater than 2000 Ohm×cm. The deposition can be carried out epitactically and the measurement can be carried out by resistance measurement (SRP).

A monochlorosilane having such a high content of monochlorosilane could hitherto not be prepared because there was hitherto no known process which provided monochlorosilane in sufficient amounts to enable it to be subjected to the at least one thermal separation process step disclosed and be isolated with the content mentioned and preferably in the purity mentioned.

The invention also provides for the use of monochlorosilane, in particular pure monochlorosilane, particularly preferably high-purity monochlorosilane, for the deposition of silicon, for the production of high-purity silicon and/or as epitaxy gas for producing high-purity Si layers, in particular in the production of chips, or else for preparing organofunctional silanes. The advantage of the use according to the invention is the significantly reduced exposure of the plant components to chlorine-containing gases, based on the liberation of chlorine in mole per mole of silicon deposited, with significantly lower deposition temperatures being able to be realized at the same time. This makes the process more efficient and the life of the plants is increased.

Figure 2:
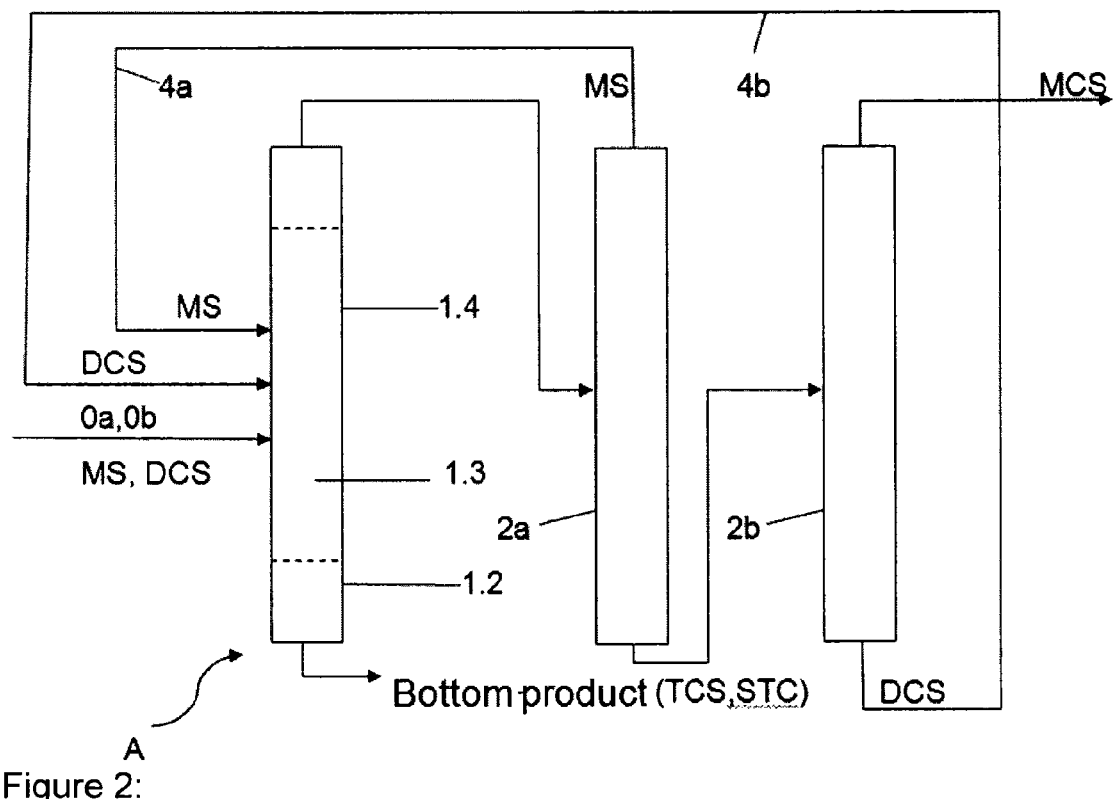

The invention also provides a plant for preparing monochlorosilane from monosilane and dichlorosilane, in particular for the continuous preparation thereof, preferably by a process according to any of Claims 1 to 15, which comprises at least one introduction of starting materials into a reaction region of a reactor, which reaction region contains a catalyst, preferably a basic catalyst, where the reactor optionally comprises a column, preferably a reactive column; a tube reactor, a loop reactor or a stirred vessel; the reactor also has at least one reaction region which can comprise a plurality of reaction zones; and the reactor is assigned at least one column, preferably two columns, for the thermal separation of the crude product obtained from the reaction of monosilane and dichlorosilane. A particularly preferred plant comprises a reactive column having at least one reaction region as reactor, and a crude product is taken off at the lower end and at the upper end of the reactive column. The upper end of the reactive column (overhead crude product) is assigned a column, preferably a first rectification column, into whose middle inlet the crude product is fed (FIG. 2). In an alternative variant, the bottom of the first rectification column can have a connecting line into the reactor or an upstream reservoir (FIG. 1), in particular for recirculation of dichlorosilane to the reaction region. Monosilane is obtained at the top of the first rectification column (FIGS. 1 and 2). Monochlorosilane is taken and separated off as intermediate boiler via the side offtake of a column (FIG. 1).

A further particularly preferred plant comprises at least one tube reactor having at least one reaction region, with the tube reactor being assigned at least one column, preferably two columns, for the thermal separation of the crude product obtained from the reaction of monosilane and dichlorosilane. In a particularly preferred embodiment, the plant comprises a series arrangement of units comprising a tube reactor and at least one column, preferably two columns; from 1 to 10 of these units can be connected in series or in parallel. Such a unit more preferably comprises connecting lines for recirculating and/or feeding starting material into all tube reactors of the units in order to be able to set a defined ratio of monosilane to dichlorosilane, preferably from 8 to 10 mol % of DCS, on entry of the starting materials into the tube reactor. The product monochlorosilane is thermally separated off from each unit and collected.

In a further alternative variant, the first rectification column can be assigned a second rectification column at its lower end in order to recirculate the bottom product (crude product monochlorosilane) from the first rectification column to the middle inlet of the second rectification column. At the upper end of the first rectification column, there is a connecting line to recirculate the monosilane into the reaction region or an upstream reservoir. Pure monochlorosilane is taken off as overhead product from the second rectification column (FIG. 2). The lower end of the second rectification column is provided with a connecting line for recirculation of dichlorosilane.

The plant therefore preferably has at least one column, in particular at least one rectification column, by means of which dichlorosilane and/or monosilane present in the process is/are separated off from the crude product; preference is given to both the upper end and the lower end of the reactive column being assigned at least one rectification column, with the rectification column assigned to the upper end having, at its upper end, a connecting line for feeding starting materials into the reactor or a reservoir which is located upstream of the reactor and from which the dichlorosilane and/or monosilane is/are supplied to the reaction. A second rectification column $2b$ downstream of the rectification column $2a$ preferably has a connecting line $4b$ at its lower end for recirculation of starting material into the reactor or a reservoir $6a$, $6b$. As an alternative, the lower end of the reactive column $1.2$ can be assigned a rectification column $3a$ which at its upper end has a connecting line $4b$ for recirculation of the starting material; empty containers for receiving pure chlorosilanes are optionally detachably assigned to the corresponding rectification columns.

In a preferred alternative variant, dichlorosilane, optionally in the reaction mixture, is taken off from the reactive column below the starting material inlet and returned to a point above the starting material inlet, preferably by means of a pump (FIG. 3).

The plant for preparing monochlorosilane comprises a reaction region, preferably in a reactor, containing the catalyst for the reaction of monosilane and dichlorosilane. The crude product formed in the reactor or reaction region is transferred into at least one subsequent thermal separation process step and monochlorosilane is obtained, possibly in admixture with more highly chlorinated silanes. The crude product is preferably subjected to a plurality of thermal separation process steps and monochlorosilane is isolated in pure form. The plant of the invention also comprises at least one detachably connected empty container for receiving monochlorosilane and optionally corresponding empty containers for receiving pure tetrachlorosilane, trichlorosilane. The empty container is preferably assigned to a rectification column. The empty containers are made of high-purity, inert material and are therefore suitable as storage and transport containers for high-purity monochlorosilane or the other high-purity silanes.

The further unreacted starting materials or by-products formed are isolated in an analogous way. Monosilane and dichlorosilane isolated from the crude product are preferably returned together with fresh starting materials (monosilane and dichlorosilane) to the reaction region in the amount necessary to set the preferred molar ratio of monosilane to dichlorosilane of from 15:1 to 6:1, in particular from 13:1 to 8:1, preferably from 12:1 to 8:1, particularly preferably from about 12:1 to 9:1 (in each case plus/minus 0.5).

The at least one reaction region containing the catalyst can be a region of the reactor, e.g. a reactive column, for example a section of a column, preferably a bubble cap tray or distributor tray. It will be clear to a person skilled in the art that a plurality of reaction regions, i.e. a plurality of distributor trays, can be provided in order to shift the equilibrium and to increase the yield.

For the purposes of the present invention, a reactor is preferably an enclosed structural unit, preferably a reactive column, a tube reactor, batch reactor, loop reactor or a side reactor of a column which encompasses a reaction region. A stirred vessel can also be advantageous.

The at least one thermal separation process step is preferably carried out in a column, in particular a distillation column, particularly preferably in a rectification column having metal packing, particularly preferably high-performance metal packing. These columns can have a plurality of theoretical plates. A person skilled in the art will know that, to achieve complete separation of the crude product into the silanes present, it is possible to use one or more columns, in particular rectification columns in order to fractionate the overhead product obtained from the first column further and to fractionate the bottom product obtained at the bottom of the first column further.

The invention is illustrated below with the aid of the embodiments shown in the figures. The figures show:

FIG. 1: plant comprising a tube reactor for preparing monochlorosilane by comproportionation;

FIG. 2: plant for preparing monochlorosilane, comprising a reactive column and two downstream rectification columns ($2a$, $2b$);

FIG. 3: section of a plant for preparing monochlorosilane with reactive distillation;

FIG. 4: plant for preparing monochlorosilane comprising a reactive column and two or three downstream rectification columns ($2a$, ($2b$), $3a$).

GENERAL ILLUSTRATIVE EMBODIMENT

A plant A as per FIG. 1 comprises a tube reactor $1.1$ having a reaction region $1.4$ and catalyst $1.3$ from which the crude product is transferred into a column $2$ for thermal separation; preference is given to two columns being connected in series, and the reactor with column(s) can also be referred to as one unit. Monochlorosilane $2.2$ is separated off thermally and collected and monosilane $2.1$ and dichlorosilane $2.3$ are separated off thermally and recirculated in a defined ratio to the tube reactor $1.1$ or a downstream tube reactor $1.1$ (2 to n) as feed stream. Preference is given to introducing MS into a tube reactor and then adding DCS in a defined ratio. Such a plant can be operated in the recycle mode, with the feed stream into the reactor always being set to a defined composition or a plant being able to comprise at least two units, in particular from three to 10 units. The tube reactor of FIG. 1 can also be combined with the double column system of FIG. 2 and operated in the recycle mode as one such unit. As an alternative, from 2 to n of these units can also be connected in series. Monochlorosilane is preferably taken off from the recycle process at a side offtake $2.2$ of the rectification column $2$ (see FIG. 1).

In a particularly preferred process variant (FIG. 3), monosilane and dichlorosilane are introduced into a reaction region $1.4$ of a column $1.2$, in particular a reactive column $1.2$, with the reaction region $1.4$ preferably being essentially in the middle region of the column (FIGS. 2, 3). This can be done as a mixture, separately or in countercurrent, i.e. monosilane is introduced into the lower region and dichlorosilane is introduced into the upper region of the middle region of the column. In addition, dichlorosilane or a dichlorosilane-containing mixture can be taken off from the column $1.2$ at a point above the bottom and below the reaction region $1.4$ and be returned to the column above the reaction region or in the reaction region (FIG. 3). The reaction region $1.4$ of the column $1.2$ can optionally be combined above and/or below with rectification regions. The overhead product $2.1$ from the column $1.2$ is essentially enriched in low boilers such as the desired product monochlorosilane and also monosilane and dichlorosilane. The monochlorosilane can be isolated in pure form by means of thermal separation process steps using methods with which those skilled in the art will be familiar. Thus (i) (for example FIG. 1) the monochlorosilane can be taken off as middle fraction $2.2$ from a column $2a$, in particular a rectification column $2a$, and monosilane can be taken off as overhead product $2.1$ and dichlorosilane can be taken off as bottom product 2.3 or (ii) (for example FIG. 2) monosilane can be taken off as overhead product 2.1 and monochlorosilane and dichlorosilane can be taken off as bottom product 2.3 from a rectification column 2a and this is then separated in a downstream second column 2b into pure monochlorosilane as overhead product and dichlorosilane as bottom product.

The bottom product 2.3 from the column 2a (for example FIG. 1) is essentially enriched in high boilers such as trichlorosilane, tetrachlorosilane and may also contain dichlorosilane and is preferably fractionated further in downstream thermal separation process steps, preferably in at least one further rectification column 2b. Thus, trichlorosilane can be discharged, possibly together with dichlorosilane, at the top and tetrachlorosilane can be discharged at the bottom of 2b. Trichlorosilane and dichlorosilane can subsequently be separated by means of a further column 2c. If dichlorosilane is discharged at the top of the rectification column 2b, then trichlorosilane and tetrachlorosilane are discharged at the bottom and separated in a further column 2c. As an alternative, trichlorosilane can be taken off as middle fraction from the rectification column 2b and dichlorosilane can be taken off at the top and tetrachlorosilane at the bottom.

A preferred plant A for preparing monochlorosilane comprises a reactor 1 configured as a reactive column 1.2 which contains the catalyst 1.3 in the reaction region 1.4 and is connected directly to at least one rectification apparatus 2, 3 (FIGS. 2, 3). The rectification apparatus 2, 3 has the task of separating monochlorosilane formed from unreacted starting materials monosilane and dichlorosilane in the side stream (FIG. 1). An alternative plant A for preparing monochlorosilane comprises a reactor 1 configured as tube reactor 1.1 which contains the catalyst 1.3 and is connected directly to at least one rectification apparatus 2, 3 (FIG. 1). In a further embodiment (FIG. 2), monochlorosilane is condensed out at the top of the rectification column 2b and is taken off from the system in liquid form. Monosilane remains in the plant and continues to be available for the reaction. It is preferably recirculated in a defined amount via a connecting line 4a to the reaction region 1.4. Dichlorosilane is discharged as bottom from the column 2b and is recirculated by means of a connecting line 4b to the reactor.

LIST OF REFERENCE SYMBOLS

A plant
0a, 0b starting material feed line
1 reactor
1.1 tube reactor
1.2 reactive column
1.3 catalyst
1.4 reaction region
2 column, in particular rectification column
2a, 2b, . . . column(s) downstream at the upper end of the reactive column
2.1 top of the column
2.2 side stream
2.3 bottom of the column
3 (3a, 3b, . . . ) column(s) downstream at the lower end of the reactive column
4 (4a, 4b, . . . ) connecting line
5 pump
6a, 6b reservoir
Silanes:  MS=monosilane   DCS=dichlorosilane;
MCS=monochlorosilane;   TCS=trichlorosilane;
STC=tetrachlorosilane

EXAMPLES

General Preparative Examples

Catalyst:
Diisobutylaminopropyltriethoxysilane or ceramic spheres modified with hydrolysis and/or condensation products thereof (diameter about 0.5 cm). The production of the catalyst is described in DE 371444 A1, whose disclosure content is fully incorporated by reference into the present document. To produce the catalyst, the aminosilane is immobilized in the presence of a water-containing alcohol, e.g. ethanol or methanol, which preferably corresponds to the eliminated hydrolysis alcohol of the silane on spherical $SiO_2$ support material and dried, optionally under reduced pressure and at elevated temperature.

Process and Plant:
a) The process is carried out in a plant A as shown in FIG. 1. The reactor 1 with reaction region 1.4, for example a tube reactor 1.1, having at least one starting material feed line (0a, 0b) contains the catalyst 1.3 in the reaction region 1.4. Monosilane and dichlorosilane are fed in in a defined molar ratio and reacted in the reaction region 1.4 of the reactor 1. The substances monosilane, monochlorosilane and dichlorosilane leaving the reactor are fed to a rectification apparatus 2, in particular a rectification column 2, and fractionally distilled there. Monochlorosilane is taken off as side stream 2.2 from the column 2, monosilane is taken off at the top 2.1 of the column and dichlorosilane and any trichlorosilane and/or tetrachlorosilane formed are taken off at the bottom 2.3 of the column. As an alternative, it is preferred for monochlorosilane to be taken off at a side offtake of a reactive column 1.2 (not shown in the figures), in particular a rectification column 2 (see FIG. 1). The bottom product can be fed to a further rectification in at least one rectification column 3 and separated there into dichlorosilane and the more highly chlorinated silanes. Further fractionation can be carried out using at least one further column 3'. Monosilane and/or dichlorosilane or mixtures in which they are present are recirculated as starting materials to the reactor 1 by means of a connecting line 4. Apart from these recirculated silanes, monosilane and dichlorosilane are fed in the stoichiometric ratio to the reactor 1 in amounts corresponding to the monochlorosilane which has been stoichiometrically formed and taken off; in particular, the ratio of from about 20:1 to 6:1, particularly preferably from 19:1 to 8:1, is continuously set or, as an alternative, a ratio of from 13:1 to 8:1, preferably from 12:1 to 8:1, is set.

b) A production process is carried out in a plant A as shown in FIG. 3. The process of the invention can be carried out continuously in the plant depicted. According to the invention, transfer to the distillation column is effected via a middle inlet on the column. In the production process, monosilane and dichlorosilane (reservoir 6a, 6b) are fed in a molar ratio of 1:1 (starting material feed stream 0a, 0b) into the reaction region 1.4 containing the catalyst 1.3 and reacted there. In the plant shown in FIG. 3, dichlorosilane is taken off from the column 1.2 at a point below the starting material feed line (0a, 0b) and returned to the reactive column 1.2 at a point above the starting material feed line 0a, preferably by means of a pump 5.

The substances monosilane, monochlorosilane, dichlorosilane and possibly trichlorosilane and silicon tetrachloride are obtained from the distillation column designed as reactive column 1.2. They are fed to at least one rectification apparatus (2, 3) and separated there into the individual silanes by distillation. Monosilane and monochlorosilane leave the reactive column 1.2 at the top (transfer to at least one column 2a, 2b, . . . ), and any trichlorosilane and silicon tetrachloride formed are discharged via the bottom of the column (transfer to at least one column 3a, 3b, . . . ).

Alternatives to the Discharge of Dichlorosilane:

B.1) When dichlorosilane is discharged at the bottom, the dichlorosilane is transferred together with TCS and STC into a downstream distillation column 3a and obtained there as overhead product and preferably recirculated to the reaction region (FIG. 4), while TCS and STC are discharged as bottom product. TCS and STC can, if required, be separated into the individual compounds in a further column 3b. The mixture comprising monosilane and monochlorosilane obtained at the top of the reactive column 1.2 is transferred into a distillation column 2a, preferably at a middle inlet. Monosilane is separated off at the top of the distillation column 2a and recirculated via a connecting line 4a to the reaction region 1.4, while monochlorosilane is taken off at the bottom, optionally as crude product. If further purification of the monochlorosilane is necessary, it is transferred to a further distillation column 2b, preferably at a middle inlet, and pure monochlorosilane is obtained as overhead product from the column 2b (see FIG. 4).

B.2) When dichlorosilane is separated off at the top of the reactive column 1.2, monosilane, monochlorosilane and dichlorosilane are (FIG. 3) transferred to a distillation column 2a, preferably at a middle inlet. Monosilane is obtained at the top of the column 2a and recirculated into the reaction region 1.4 via a connecting line 4a to the reactor 1 or into the reaction region 1.4, while monochlorosilane and dichlorosilane are transferred as bottom fraction to a further distillation column 2b, preferably at a middle inlet. Pure monochlorosilane is separated off at the top of this column and is collected in an empty container. Dichlorosilane is obtained as bottom product from 2b and is introduced or recirculated into the reactor 1 or reaction region 1.4 by means of a connecting line 4b.

Depending on the mode of operation, unreacted dichlorosilane is separated off at the top or at the bottom. Both the crude overhead product and the crude bottom product are separately purified further by means of at least one rectification apparatus (crude overhead products: columns downstream 2a, 2b, 2c, etc.; crude bottom products: columns downstream 3a, 3b, 3c, etc.).

Comparative Example

Dismutation Starting Out from Dichlorosilane

Dichlorosilane was metered at a pressure of 30 bar and a temperature of 40° C. and a flow rate of 10 mol/h into a tube reactor having an internal diameter of 20 cm and a length of 2.8 m. Ceramic spheres modified with diisobutylaminopropyltriethoxysilane were used as catalyst (diameter about 0.5 cm, amount used about 54 kg of catalyst spheres). A mixture of monosilane, monochlorosilane, dichlorosilane and a small proportion of silicon tetrachloride was obtained as crude at the reactor outlet.

Composition of Crude Product in Mol %:
monosilane: 14.18%
monochlorosilane: 10.95%
dichlorosilane: 38.03%
trichlorosilane: 36.22%
silicon tetrachloride: 0.59%

In the pure dismutation starting out from dichlorosilane, large amounts of trichlorosilane and monosilane are formed as by-products in addition to the target product monochlorosilane and have to be removed from the process. The selectivity to monochlorosilane is low. The unreacted dichlorosilane can be returned to the process. The composition of the crude product was determined by means of GC.

Example 1

Comproportionation

Monosilane and dichlorosilane were metered in a molar ratio of 92 mol % and 8 mol % at a pressure of 30 bar and a temperature of 40° C. and a flow rate of 10 mol/h into a tube reactor having an internal diameter of 20 cm and a length of 2.8 m. Ceramic spheres modified with diisobutylaminopropyltriethoxysilane were used as catalyst (diameter about 0.5 cm, amount used about 54 kg of catalyst spheres). Monosilane, monochlorosilane and dichlorosilane having a low content of trichlorosilane were obtained as crude product at the reactor outlet.

Composition of Crude Product in Mol %:
monosilane: 85.99%
monochlorosilane: 8.40%
dichlorosilane: 5.25%
trichlorosilane: 0.37%

This crude product was fractionated in a double column system. Monochlorosilane was separated off and taken from the process. Monosilane was separated off and returned to the process. The dichlorosilane contaminated with trichlorosilane was subsequently added in the amount required to set a composition of about 92 mol % of monosilane and 8 mol % of dichlorosilane for a further reaction over the catalyst in a second tube reactor. The crude product from the second reaction had a composition in mol % of:
monosilane: 85.62%
monochlorosilane: 8.33%
dichlorosilane: 5.32%
trichlorosilane: 0.73%

This second crude product was fractionated in a double column system. Monochlorosilane was separated off and taken from the process. Monosilane was separated off and returned to the process. The dichlorosilane contaminated with small amounts of trichlorosilane was subsequently introduced in the amount required to set a composition of about 92 mol % of monosilane and 8 mol % of dichlorosilane for a further reaction over the catalyst in a second tube reactor. The crude product from the third reaction had a composition in mol % of:
monosilane: 85.19%
monochlorosilane: 8.35%
dichlorosilane: 5.46%
trichlorosilane: 1.00%

This third crude product was likewise fractionated in a double column system. Dichlorosilane and trichlorosilane were subsequently separated by distillation. Dichlorosilane could be returned as pure dichlorosilane to the process. The composition of the crude products was determined for monosilane, monochlorosilane and dichlorosilane by means of GC. The small content of the by-product trichlorosilane was determined by means of NMR.

The comproportionation starting out from dichlorosilane and monosilane forms, when the correct mixing ratio is selected, only very small proportions of by-products (trichlorosilane) which have to be removed from the process in addition to the target product. Unreacted starting materials can be returned to the process.

Example 2

Dichlorosilane and monosilane were metered in a molar ratio of 1:1 at a pressure of 20 bar and a rate of 100 g/h or 1.5 mol/h (corresponding to 24.1 g of monosilane and 75.9 g of dichlorosilane) at a temperature of 18.5° C. into the middle inlet (reaction region) of a reactive column (internal diameter 10 cm, length 1.5 m, 32 theoretical plates, volume 1.6 l). Ceramic spheres modified with diisobutylaminopropyltriethoxysilane were used as catalyst (diameter about 0.5 cm, amount used: 5.5 kg of catalyst spheres). 33.4 g/h were taken off continuously at the bottom of the column at a temperature of 158.6° C. (20 bar). Composition of the bottom product (GC %):
monosilane 0.00
monochlorosilane 0.00
dichlorosilane 0.10
trichlorosilane 89.70
silicon tetrachloride 10.20

At the top of the column, 66.6 g/h were taken off continuously at a temperature of 6.9° C. (20 bar). Composition of the overhead product (GC %):
monosilane 31.40
monochlorosilane 46.27
dichlorosilane 22.23
trichlorosilane 0.10
silicon tetrachloride 0.00

In this example, all of the bottom stream was removed from the process. The overhead stream can be fractionated by distillation methods which are well known to those skilled in the art. In a two-column system: 1st column monosilane at the top, MCS and DCS at the bottom (cf. FIG. 2), 2nd column MCS at the top, DCS at the bottom.

As an alternative, monochlorosilane can be taken off at a side stream offtake from a distillation column and monosilane is taken off at the top of the column while dichlorosilane leaves the rectification column at the bottom of the column (FIG. 1). Trichlorosilane is obtained as a further secondary stream.

After being taken off from the rectification, monosilane and dichlorosilane can be returned to the reaction region. In addition to these amounts, the reactor additionally receives the amounts of monosilane and dichlorosilane which correspond stoichiometrically to the amount of monochlorosilane formed and taken off.

Example 3

Dichlorosilane and monosilane were metered in a molar ratio of 1:1 at a pressure of 20 bar and a rate of 100 g/h or 1.5 mol/h (corresponding to 24.1 g of monosilane and 75.9 g of dichlorosilane) at a temperature of 18.5° C. into the middle inlet (reaction region) of the reactive column (internal diameter 10 cm, length 1.5 m, 32 theoretical plates, volume 1.6 l). Ceramic spheres modified with diisobutylaminopropyltriethoxysilane were used as catalyst (diameter about 0.5 cm, amount used: 5.5 kg of catalyst spheres). 61.9 g/h were taken off continuously at the bottom of the column at a temperature of 140.1° C. (20 bar) (FIG. 4). Composition of the bottom product (GC %):
monosilane 0.00
monochlorosilane 0.00
dichlorosilane 30.22
trichlorosilane 68.90
silicon tetrachloride 0.78

At the top of the column, 38.1 g/h were taken off continuously at a temperature of –26.9° C. (20 bar). Composition of the overhead product (GC %)
monosilane 69.54
monochlorosilane 30.36
dichlorosilane 0.10
trichlorosilane 0.00
silicon tetrachloride 0.00

In this example, the bottom stream is distilled in a column 3a. DCS (dichlorosilane) is taken off at the top and recirculated 4b to the process. TCS (trichlorosilane) and STC (silicon tetrachloride) in the bottoms are removed from the process. The overhead stream is distilled in a column 2a, with monosilane being obtained at the top and MCS (monochlorosilane) being obtained at the bottom. If required, MCS can be purified further, for example by means of a further column 2b.

To obtain MCS in high purity, a further overhead distillation 2b is carried out. After being taken off from the rectification, monosilane and dichlorosilane are returned to the reaction region. Apart from these amounts, the reactor additionally receives the amount of monosilane and dichlorosilane which correspond stoichiometrically to the amount of monochlorosilane formed and taken off.

The invention claimed is:

1. A process for preparing monochlorosilane, the process comprising reacting monosilane and dichlorosilane in the presence of a catalyst to form monochlorosilane,
wherein
the monosilane and the dichlorosilane are comproportionated in the presence of the catalyst, and
the comproportionation occurs with a defined molar ratio of from 13:1 to 8:1 of monosilane to dichlorosilane.

2. The process of claim 1, wherein monochlorosilane is formed from monosilane and dichlorosilane in a continuous process.

3. The process of claim 1, wherein monosilane and dichlorosilane are fed separately, in admixture or in countercurrent into a reaction region.

4. The process of claim 1, wherein the comproportionation occurs in a reaction region of a reactor.

5. The process of claim 1, wherein at least part of a crude product is separated in at least one downstream thermal separation into monochlorosilane, monosilane, dichlorosilane and optionally trichlorosilane and/or tetrachlorosilane.

6. The process of claim 1, wherein formation of trichlorosilane and/or tetrachlorosilane is substantially suppressed.

7. The process of claim 1, wherein monosilane and/or dichlorosilane present after the reaction and optionally a thermal separation process step are returned, in each case independently or in admixture, as starting materials to a reaction region.

8. The process of claim 1, wherein the catalyst is supported.

9. The process of claim 1, wherein the catalyst comprises an aminoalkoxysilane or a hydrolysis and/or condensation product thereof.

10. The process of claim 1, wherein the catalyst comprises an aminoalkoxysilane of formula (1) or at least one hydrolysis and/or condensation product thereof:

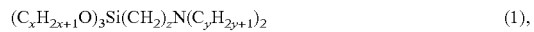

$$(C_xH_{2x+1}O)_3Si(CH_2)_zN(C_yH_{2y+1})_2 \quad (1),$$

wherein:
x=1 to 4;
y=1 to 10; and
z=1 to 3,
or a monomeric or oligomeric aminosilane derived therefrom which is chemically bound to a support material.

11. The process of claim 8, wherein the catalyst is supported by shaped bodies comprising silicon oxide.

12. The process of claim 1, wherein the reaction occurs in a temperature range from –50° C. to 200° C. and/or in a pressure range from 0.0001 bar to 200 bar(abs.).

* * * * *